US009304252B2

(12) United States Patent  
Huang et al.

(10) Patent No.: US 9,304,252 B2  
(45) Date of Patent: *Apr. 5, 2016

(54) LAYERED OPTICAL WAVEGUIDE AND NEAR FIELD TRANSDUCER

(71) Applicant: SEAGATE TECHNOLOGY LLC, Cupertino, CA (US)

(72) Inventors: Xiaoyue Huang, Eden Prairie, MN (US); Michael C. Kautzky, Eagan, MN (US); Tong Zhao, Eden Prairie, MN (US)

(73) Assignee: Seagate Technology LLC, Cupertino, CA (US)

(*) Notice: Subject to any disclaimer, the term of this patent is extended or adjusted under 35 U.S.C. 154(b) by 101 days.

This patent is subject to a terminal disclaimer.

(21) Appl. No.: 14/182,486

(22) Filed: Feb. 18, 2014

(65) Prior Publication Data

US 2015/0277039 A1    Oct. 1, 2015

Related U.S. Application Data

(63) Continuation of application No. 13/795,623, filed on Mar. 12, 2013, now Pat. No. 8,681,595.

(51) Int. Cl.
*G11B 7/00* (2006.01)
*G02B 6/122* (2006.01)
(Continued)

(52) U.S. Cl.
CPC  *G02B 6/122* (2013.01); *G02B 6/02* (2013.01); *G11B 5/314* (2013.01); *G11B 5/4866* (2013.01); *G11B 7/1206* (2013.01); *G11B 2005/0021* (2013.01)

(58) Field of Classification Search
CPC ............... G11B 5/4866; G11B 2205/0021; G11B 5/314; G11B 5/6088; G11B 2005/001; G11B 7/1384; G11B 7/1206; G11B 7/1263; G02B 7/135; G02B 6/122; G02B 6/02
USPC .............. 369/112.27, 112.09, 13.33, 13.13
See application file for complete search history.

(56) References Cited

U.S. PATENT DOCUMENTS 5,987,046 A   11/1999   Kobayashi
7,236,332 B2   6/2007   Stipe
(Continued)

FOREIGN PATENT DOCUMENTS

JP        2012-084214        4/2012

*Primary Examiner* — Ali Neyzari
(74) *Attorney, Agent, or Firm* — Mueting, Raasch & Gebhardt, P.A.

(57) ABSTRACT

Waveguides that include a top cladding layer made of a material having an index of refraction $n_4$; a core bilayer structure, the core bilayer structure including a lower index core layer having an index of refraction $n_3$; and a higher index core layer having an index of refraction $n_1$, wherein the higher index core layer includes $TiO_2$ and one or more than one of $Nb_2O_5$, $CeO_2$, $Ta_2O_5$, $ZrO_2$, $HfO_2$, $Y_2O_3$, $Sc_2O_3$, $MgO$, $Al_2O_3$ and $SiO_2$, wherein the lower index core layer is adjacent the higher index core layer; a bottom cladding layer made of a material having an index of refraction $n_2$, wherein the waveguide is configured with the higher index core layer of the core bilayer structure adjacent the top cladding layer and the lower index core layer of the core bilayer structure adjacent the bottom cladding layer, and wherein $n_4$ is less than $n_3$ and $n_1$, and $n_2$ is less than $n_3$ and $n_1$.

20 Claims, 4 Drawing Sheets

(51) Int. Cl.
  *G11B 7/12* (2012.01)
  *G02B 6/02* (2006.01)
  *G11B 5/31* (2006.01)
  *G11B 5/48* (2006.01)
  *G11B 5/00* (2006.01)

(56) References Cited

U.S. PATENT DOCUMENTS

| | | |
|---|---|---|
| 7,310,206 B2 | 12/2007 | Liu |
| 8,149,657 B2 | 4/2012 | Huang |
| 8,169,881 B2 | 5/2012 | Balamane |
| 8,200,054 B1 | 6/2012 | Li |
| 8,295,010 B2 | 10/2012 | Shimazawa |
| 8,400,902 B2 | 3/2013 | Huang |
| 8,451,555 B2 | 5/2013 | Seigler |
| 8,509,037 B1 | 8/2013 | Huang |
| 8,644,124 B2 * | 2/2014 | Huang et al. ............ 369/112.27 |
| 8,681,595 B1 * | 3/2014 | Huang et al. ............ 369/112.27 |
| 8,873,349 B2 * | 10/2014 | Peng ........................ 369/13.33 |
| 2006/0090178 A1 | 4/2006 | Stipe |
| 2006/0143635 A1 | 6/2006 | Liu |
| 2008/0239541 A1 | 10/2008 | Shimazawa |
| 2010/0165822 A1 | 7/2010 | Balamane |
| 2010/0321815 A1 | 12/2010 | Zhou |
| 2013/0279313 A1 | 10/2013 | Huang |
| 2013/0279314 A1 | 10/2013 | Peng |

* cited by examiner

LAYERED OPTICAL WAVEGUIDE AND NEAR FIELD TRANSDUCER

PRIORITY

This application is a continuation of and claims priority to U.S. application Ser. No. 13/795,623 filed Mar. 12, 2013, now U.S. Pat. No. 8,681,595, the disclosure of which is incorporated herein by reference.

BACKGROUND

In thermally assisted magnetic/optical recording, information bits are recorded to a storage layer of a storage media at elevated temperatures. Generally, a spot or bit on the storage medium is heated to reduce its coercivity sufficiently so that an applied magnetic field or optical write signal can record data to the storage medium. Current methods of heating the storage media include directing and focusing energy onto the storage media. Different and more advantageous methods and devices for focusing the energy are needed in order to decrease the size of the heated spot in order to increase the storage density of the storage media.

SUMMARY

Disclosed are waveguides that include a top cladding layer made of a material having an index of refraction $n_4$; a core bilayer structure, the core bilayer structure including a lower index core layer having an index of refraction $n_3$; and a higher index core layer having an index of refraction $n_1$, wherein the higher index core layer includes $TiO_2$ and one or more than one of $Nb_2O_5$, $CeO_2$, $Ta_2O_5$, $ZrO_2$, $HfO_2$, $Y_2O_3$, $Sc_2O_3$, MgO, $Al_2O_3$ and $SiO_2$, wherein the lower index core layer is adjacent the higher index core layer; a bottom cladding layer made of a material having an index of refraction $n_2$, wherein the waveguide is configured with the higher index core layer of the core bilayer structure adjacent the top cladding layer and the lower index core layer of the core bilayer structure adjacent the bottom cladding layer, and wherein $n_4$ is less than $n_3$ and $n_1$, and $n_2$ is less than $n_3$ and $n_1$.

Also disclosed are devices that include a light source; and a waveguide, the waveguide including: a top cladding layer made of a material having an index of refraction $n_4$; a core bilayer structure, the core bilayer structure including a lower index core layer having an index of refraction $n_3$; and a higher index core layer having an index of refraction $n_1$, wherein the higher index core layer includes $TiO_2$ and one or more than one of $Nb_2O_5$, $CeO_2$, $Ta_2O_5$, $ZrO_2$, $HfO_2$, $Y_2O_3$, $Sc_2O_3$, MgO, $Al_2O_3$ and $SiO_2$, wherein the lower index core layer is adjacent the higher index core layer, a bottom cladding layer made of a material having an index of refraction $n_2$, wherein the waveguide is configured with the higher index core layer of the core bilayer structure adjacent the top cladding layer and the lower index core layer of the core bilayer structure adjacent the bottom cladding layer, and wherein $n_4$ is less than $n_3$ and $n_1$, and $n_2$ is less than $n_3$ and $n_1$, and wherein the light source and the waveguide are configured so that light from the light source is directed into the waveguide.

Also disclosed are disc drives that include at least one actuator arm having a flexure; at least one device, wherein each flexure has a head at the distal end thereof and wherein each device includes: a light source; and a waveguide, the waveguide including: a top cladding layer made of a material having an index of refraction $n_4$; a core bilayer structure, the core bilayer structure including: a lower index core layer having an index of refraction $n_3$; and a higher index core layer having an index of refraction $n_1$, wherein the higher index core layer includes $TiO_2$ and one or more than one of $Nb_2O_5$, $CeO_2$, $Ta_2O_5$, $ZrO_2$, $HfO_2$, $Y_2O_3$, $Sc_2O_3$, MgO, $Al_2O_3$ and $SiO_2$, wherein the lower index core layer is adjacent the higher index core layer; a bottom cladding layer made of a material having an index of refraction $n_2$, wherein the waveguide is configured with the higher index core layer of the core bilayer structure adjacent the top cladding layer and the lower index core layer of the core bilayer structure adjacent the bottom cladding layer, and wherein $n_4$ is less than $n_3$ and $n_1$, and $n_2$ is less than $n_3$ and $n_1$; a magnetic reader; and a magnetic writer.

The above summary of the present disclosure is not intended to describe each disclosed embodiment or every implementation of the present disclosure. The description that follows more particularly exemplifies illustrative embodiments. In several places throughout the application, guidance is provided through lists of examples, which examples can be used in various combinations. In each instance, the recited list serves only as a representative group and should not be interpreted as an exclusive list.

BRIEF DESCRIPTION OF THE FIGURES

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

In the following description, reference is made to the accompanying set of drawings that form a part hereof and in which are shown by way of illustration several specific embodiments. It is to be understood that other embodiments are contemplated and may be made without departing from the scope or spirit of the present disclosure. The following detailed description, therefore, is not to be taken in a limiting sense.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the properties sought to be obtained by those skilled in the art utilizing the teachings disclosed herein.

The recitation of numerical ranges by endpoints includes all numbers subsumed within that range (e.g. 1 to 5 includes 1, 1.5, 2, 2.75, 3, 3.80, 4, and 5) and any range within that range.

As used in this specification and the appended claims, the singular forms "a", "an", and "the" encompass embodiments having plural referents, unless the content clearly dictates otherwise. As used in this specification and the appended claims, the term "or" is generally employed in its sense including "and/or" unless the content clearly dictates otherwise.

"Include," "including," or like terms means encompassing but not limited to, that is, including and not exclusive. It should be noted that "top" and "bottom" (or other terms like "upper" and "lower") are utilized strictly for relative descriptions and do not imply any overall orientation of the article in which the described element is located.

The present disclosure relates to a light delivery system for use in applications where a beam of highly focused and relatively powerful electromagnetic energy is desired. As mentioned above, one such application is in thermal/heat assisted magnetic recording, referred to herein as HAMR. In reference now to FIG. 1, a perspective view shows an example HAMR slider 100. This example slider 100 includes an edge-emitting laser diode 102 integrated into a trailing edge surface 104 of the slider 100. The laser diode 102 is proximate to a HAMR read/write head 106, which has one edge on an air bearing surface (ABS) 108 of the slider 100. The ABS 108 faces and is held proximate to a moving media surface (not shown) during device operation.

Figure 1:
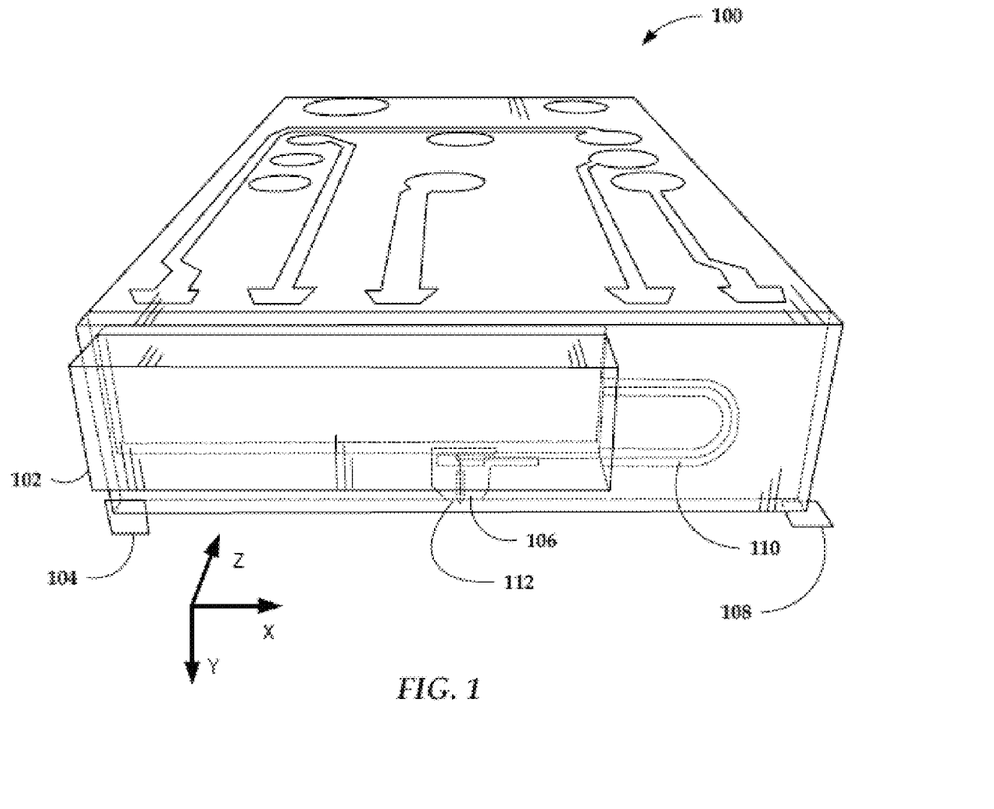
FIG. 1 is a perspective view of a thermal assisted recording slider utilizing a near field transducer and waveguide according to an example embodiment.

The laser diode 102 provides electromagnetic energy to heat the media surface at a point near to the read/write head 106. Optical coupling components, such as a waveguide 110, are formed integrally within the slider device 100 to deliver light from the laser 102 to the media. In particular, a local waveguide and NFT 112 may be located proximate the read/write head 106 to provide local heating of the media during write operations. While the laser diode 102 in this example is an integral, edge firing device, it will be appreciated that the waveguide/NFT 112 may be applicable to any light source and light delivery mechanisms. For example, surface emitting lasers (SEL) may be used instead of edge firing lasers, and the slider may use any combination of integrated and external lasers.

A HAMR device utilizes the types of optical devices described above to heat a magnetic recording media (e.g., hard disk) in order to overcome superparamagnetic effects that limit the areal data density of typical magnetic media. In order to record on this media, a small portion of the media is locally heated above the Curie temperature while being written to by a magnetic write head. A coherent light source such as a laser may provide the energy to create these hot spots, and optical components, e.g., built in to a slider that houses the write head, are configured direct this energy onto the media.

When applying light to a HAMR medium, the light is concentrated into a small hotspot over the track where writing takes place. To create this small hot spot, energy from a light source (such as a laser that is integral to or separate from the write head) may be launched into a waveguide integrated into a hard drive head. The light propagates through the waveguide and may be coupled to an optical NFT, e.g., either directly from the waveguide or by way of a focusing element.

Figure 2:
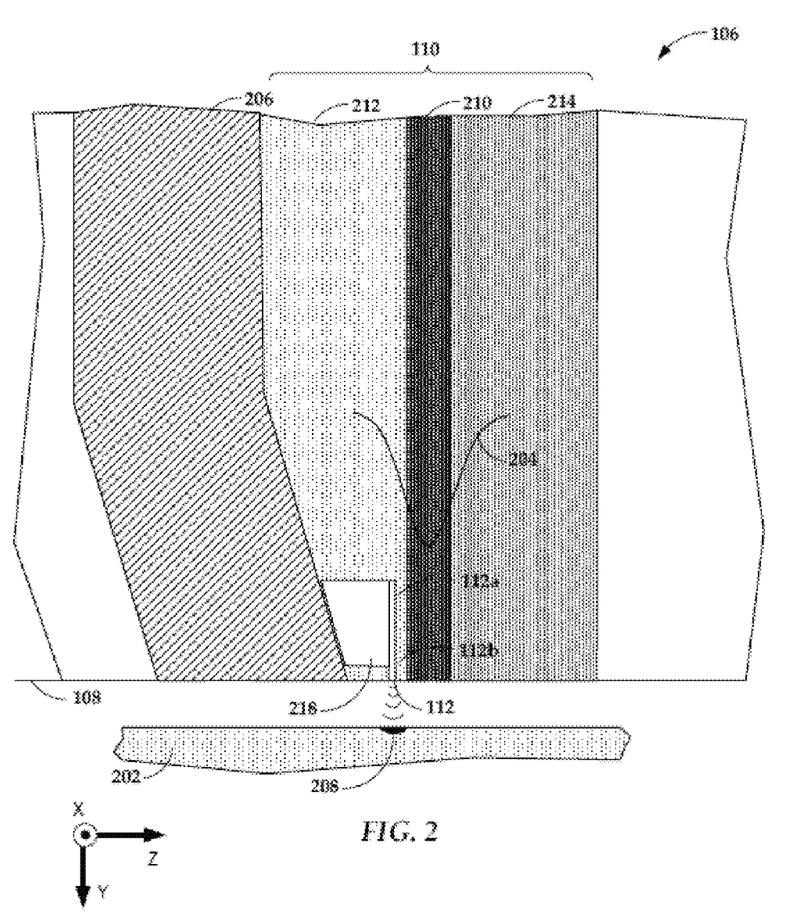
FIG. 2 is a cross-sectional view of a waveguide, write pole, and nearfield transducer according to an example embodiment.

In FIG. 2, a cross-sectional view illustrates portions of a read/write head 106 according to an example embodiment. In this view, the ABS 108 and NFT 112 are proximate to a surface of magnetic medium 202, e.g., a magnetic disk. The waveguide 110 delivers electromagnetic energy 204 to the NFT 112, which directs the energy to create a small hotspot 208 on the medium 202. A magnetic write pole 206 causes changes in magnetic flux near the ABS 108 in response to an applied current. Flux from the write pole 206 changes a magnetic orientation of the hotspot 208 as the hotspot 208 moves past the write pole 206 in the downtrack direction (Z-direction).

The waveguide 101 and NFT 112 may be formed integrally within a slider that houses the read-write head 106. These and other optical elements used in HAMR recording heads are generally known as integrated optics devices. The field of integrated optics relates to the construction of optics devices on substrates, sometimes in combination with electronic components, to produce functional systems or subsystems. Integrated optics are formed using processes similar to those used for semiconductor production, e.g., layer deposition.

For example, the waveguide 110 may transfer light from a laser (e.g., laser diode 102 in FIG. 1) to the NFT 112 via dielectric materials that are built up on a substrate using layer deposition techniques (e.g., atomic layer deposition, photoresist etching, chemical-mechanical planarization, etc.). The waveguide may be formed as a layer of materials, with middle layer 210 having a refractive index n1, and top and bottom layers 212, 214 of refractive indices n2 and n3. In configurations such as where n1>n2, and n1>n3, the middle layer 210 acts as a core and the top and bottom layers 212, 214 act as cladding (similar to an optic fiber), and therefore light will propagate efficiently through the waveguide 110.

The NFT 112, write pole 206, and other illustrated components may be formed using similar layer deposition techniques as the waveguide 110. Generally, a plasmonic device such as NFT 112 is used to focus the energy 204 instead of an optical device such as a lens or mirror. This is because the desired size of the hotspot 208 is smaller than a half-wavelength of the energy 204, and as a result optical devices are diffraction limited at this scale. As a result, the energy 204 is focused on the NFT 112, which is made of a material (e.g., Au, Ag, Cu, Al) that emits a field of surface plasmons at resonance. The NFT 112 is shaped to direct the plasmon field to the surface of the medium 202.

The energy applied to the NFT 112 to create the hotspot 208 can also cause a significant temperature rise in the NFT 112. The NFT 112 may be formed as a peg, pin, bar, or other protrusion having relatively small dimensions in order to keep the generated plasmonic field small. As a result, a heat sink 218 may be formed proximate to (or integral with) the NFT 112. The heat sink 218 may draw heat away from the NFT 112, and be thermally coupled to other components (e.g., the write pole 206) in order to dissipate the heat.

In the discussion that follows (including the analysis results show in FIGS. 5, 6A-6C, 8, 9A and 9B) the NFT 112 is configured as a circular disk (lying on the x-y plane) at an excitation location 112a, which is coupled to a peg that extends from the disk to the ABS 108 at near field generation portion 112b. This NFT 112 may be referred to herein as the "lollipop" NFT configuration. An example of a lollipop NFT 112 can be seen in US Patent Publication 2010/0123965, filed Nov. 18, 2008. In another arrangement (e.g., analysis results shown in FIG. 9C), an NFT is configured as side-by side plates with a gap therebetween. The plates lie on the x-y plane, and the gap runs in the y-direction from the excitation location 112a to the near field generation portion 112b. This arrangement is referred to herein as the "gap" NFT. An example of a gap NFT can be seen in U.S. patent application Ser. No. 13/231,546, filed on Sep. 13, 2011.

The energy carried by the waveguide 110 includes orthogonal electric fields (E-field) and magnetic fields (B-field). In order to provide high coupling efficiency, the waveguide 110 is arranged to provide a strong optical E-field amplitude incident to the NFT excitation location 112a, which is a portion of the NFT 112 facing away from the ABS 108 onto which the waveguide 110 focuses energy. However, if the NFT 112 (in the "lollipop" configuration) is immersed into high index core 210 of waveguide (e.g., n=2.08), the near field generation portion 112b of the NFT 112 (e.g., portion of the NFT 112 closest to the ABS 108) may need to be significantly reduced in size to avoid a red shift of excitation for predetermined wavelength where the optical field is peaked. Instead, as shown in FIG. 2, the NFT 112 is positioned in the relatively lower index material of the top cladding 212 (e.g. n=1.65). This location may also offer benefits in terms of fabrication, heat sinking, etc.

In order to optimize coupling between the waveguide 110 and the NFT 112, the optical mode profile can be skewed towards the side where the NFT is located. This is the approach illustrated in FIG. 2. The NFT 112 is located in the top cladding layer 212, which has a higher index of refraction than the bottom cladding layer 214.

In the arrangement illustrated in FIG. 2, the core 210 may be formed from a single material. In an alternate arrangement shown in FIG. 3, a waveguide 302 includes a core 304 with multiple layers of different index material (e.g., double layer core or index gradient core). The top and bottom claddings 212, 214 may be of differing index materials as described above. For example, top cladding layer 212 may have a higher index of refraction than bottom cladding layer 214. Generally, the layers of core 304 may each include indices of refraction that are ordered from largest to smallest based on respective proximity to the top and bottom cladding layers 212, 214.

Figure 3:
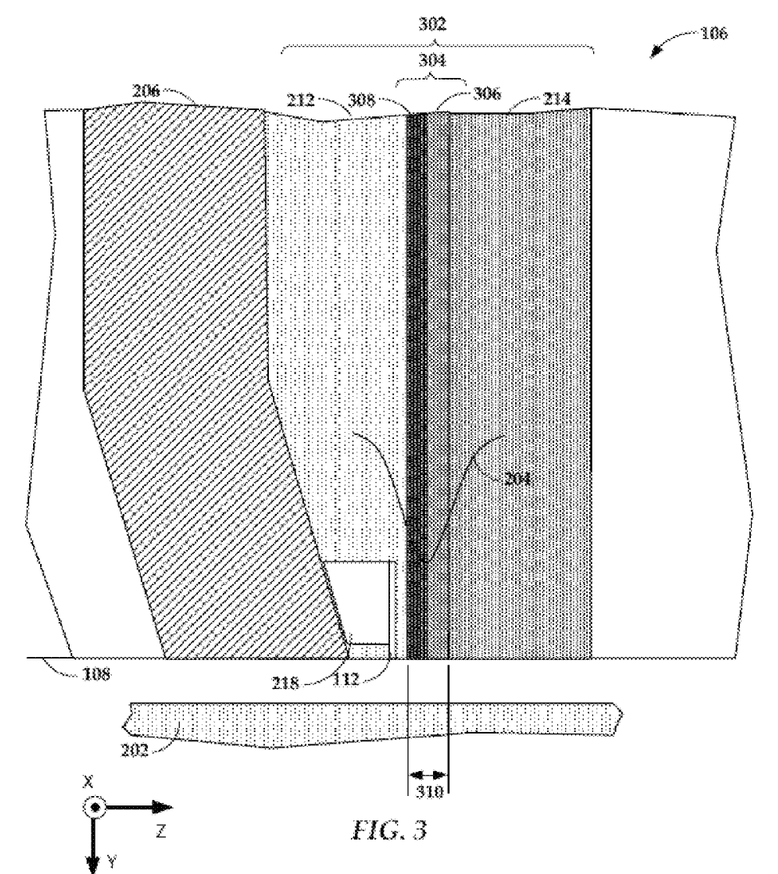
FIG. 3 is a cross-sectional view of a waveguide, write pole, and near-field transducer according to another example embodiment.

In the arrangement shown in FIG. 3, waveguide 302 can include a top cladding layer 212 made of a material having an index of refraction, n4; a bottom cladding layer 214 made of a material having an index of refraction, n2; and a core bilayer structure 304. The core bilayer structure 304 may include a lower index core layer 306 made of a material having an index of refraction n3 and a higher index core layer 308 made of a material having an index of refraction n1. As seen in FIG. 3, the higher index core layer 308 of the core bilayer structure 304 is adjacent the top cladding layer 212 and the lower index core layer 306 of the core bilayer structure 304 is adjacent the bottom cladding layer 214. With regard to the indices of refraction of the various materials, the relationship can be described as follows: n3 is less than n1; n4 is less than n3 and n1; and n2 is less than n3 and n1.

Various materials can be used for various layers. For example, the top cladding layer 212 may be formed from a material such as $Al_2O_3$, $SiO_xN_y$, (n=1.65), and the bottom cladding 214 may be formed from a lower index material, e.g. $SiO_2$ (n=1.47). In such an embodiment, where the top cladding layer 212 has a higher index of refraction than the bottom cladding layer 214, the optical mode profile can be skewed towards the side where the NFT is located (see FIG. 2).

The lower index core layer can include various materials; generally, the material of the lower index core layer can be any material that has a lower index of refraction (n3) than that of the material of the higher index core layer (n1). Such exemplary materials can include, for example $Ta_2O_5$, $Y_2O_3$, $ZrO_2$, $HfO_2$, $Si_3N_4$, or combinations thereof. In some embodiments, the lower index core layer can include $Ta_2O_5$ for example.

The higher index core layer can include various materials; generally, the material of the higher index core layer can be any material that has a higher index of refraction (n1) than any other materials in the waveguide. In some embodiments, the higher index core layer includes $TiO_2$ and a secondary material. The secondary material can be chosen from $Nb_2O_5$, $CeO_2$, $Ta_2O_5$, $ZrO_2$, $HfO_2$, $Y_2O_3$, $Sc_2O_3$, $MgO$, $Al_2O_3$, $SiO_2$, and combinations thereof. In some embodiments, the secondary material can be chosen from $Ta_2O_5$, $Nb_2O_5$, and combinations thereof. In some embodiments, the secondary material comprises $Ta_2O_5$. In some embodiments, the higher index core layer can include at least 50% by weight of $TiO_2$.

In some embodiments, the higher index core layer can include a laminated stack of alternating layers of $TiO_2$ and layers of secondary material (as exemplified above). It should be noted that this includes laminated layers of $TiO_2$ and one secondary material as well as laminated layers of $TiO_2$ and more than one secondary material. In some embodiments, the higher index core layer can include a laminated stack composed of layers of $TiO_2$ and layers of $Ta_2O_5$. In embodiments that include laminated layers of materials, the relative thickness of one type of layer to another type of layer can be further described. In some embodiments, the ratio of the thickness of the $TiO_2$ layers to the thickness of the secondary material layers thickness can be at least 1:1. In some embodiments, the ratio of the thickness of the $TiO_2$ layers to the thickness of the secondary material layers thickness can be 1:1. In some embodiments, materials with a refractive index higher than $TiO_2$ (n=2.4), for example highly densified $TiO_2$, can have a layer thickness ratio of $TiO_2:Ta_2O_5$ that is less than 1:1. In some embodiments, materials with a refractive index lower than $TiO_2$ (n=2.4), for example $Nb_2O_5$, can have a layer thickness ratio of $TiO_2:Ta_2O_5$ that is greater than 1:1.

In some embodiments, individual layers of the laminated stack can have thicknesses from 10 nm to 100 nm. In some embodiments, the individual layers of the laminated stack can have thicknesses from 30 nm to 50 nm. In some embodiments, a laminated stack can include any number of individual layers. In some embodiments, a laminated stack can include from 2 to 4 layers. In some embodiments, a laminated stack can include 2 layers.

In some embodiments, the higher index core layer can include $TiO_2$ that is doped with one or more than one secondary material. The secondary material can be chosen from $Nb_2O_5$, $CeO_2$, $Ta_2O_5$, $ZrO_2$, $HfO_2$, $Y_2O_3$, $Sc_2O_3$, $MgO$, $Al_2O_3$, $SiO_2$, and combinations thereof. In some embodiments, the secondary material can be chosen from $Ta_2O_5$, $Nb_2O_5$, and combinations thereof. In some embodiments, the secondary material comprises $Ta_2O_5$. In some embodiments, the higher index core layer can include at least 50% by weight of $TiO_2$. In some embodiments, the atomic ratio of $TiO_2$ to one or more than one of the secondary materials is not greater than 1:1 (Ti:secondary material). In some embodiments, a doped film of Ti/Ta oxides with an atomic ratio of Ta to Ti of less than 1 could provide a ternary compound with low loss (<1 dB/cm) and a high index (n≥2.3).

Use of disclosed core bilayer structures can provide high coupling efficiency that can serve to maximize output/input energy ratios. Disclosed waveguides can be utilized in HAMR applications as well as other optical waveguide applications in visible and near field wavelength ranges. Disclosed core bilayer structures offer lower optical loss, thereby leading to more efficient waveguides.

Layers making up the bilayer core structure can be fabricated using known methods, including for example reactive sputtering, ion beam deposition (IBD), evaporative techniques, atomic layer deposition (ALD), chemical vapor deposition (CVD), and radio frequency (RF) sputter deposition.

The present disclosure is illustrated by the following examples. It is to be understood that the particular examples, assumptions, modeling, and procedures are to be interpreted broadly in accordance with the scope and spirit of the invention as set forth herein.

EXAMPLES

Figure 4:
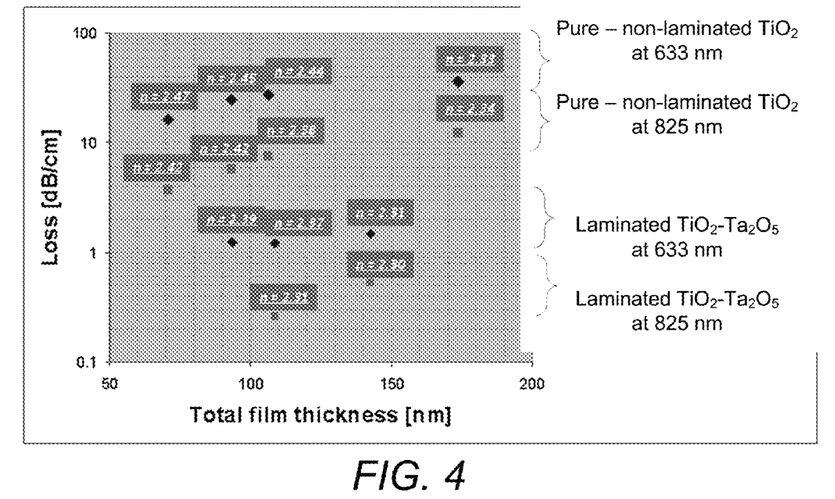
FIG. 4 shows the optical loss of the laminate versus the total film thickness measured at 633 nm and 825 nm.
Figure 5:
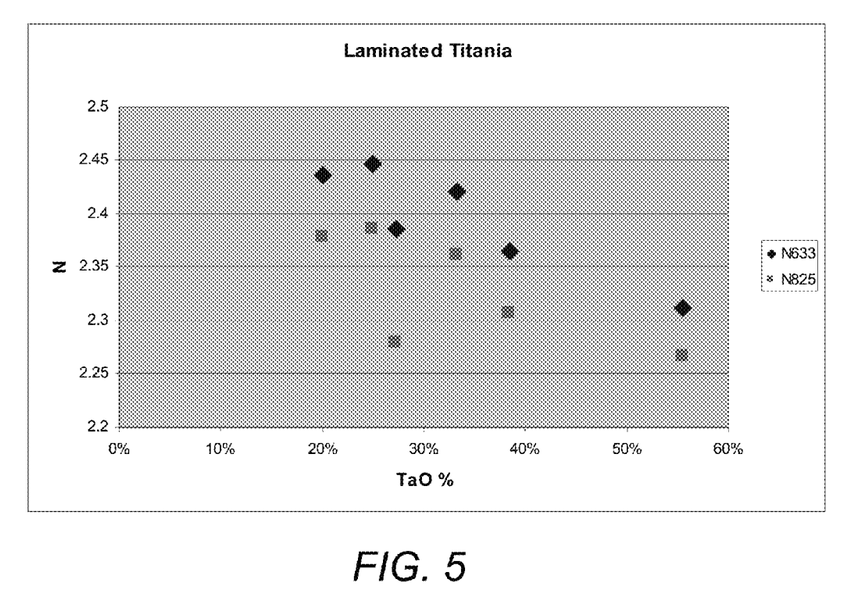
FIG. 5 shows the index of refraction at 633 nm and 825 nm for laminated films having various amounts of TaO.

A laminated structure of $TiO_2$ and $Ta_2O_5$ was demonstrated to be low loss (0.55 dB/cm) and high index (n=2.3). Such a film would be suitable for high index waveguide core. $TiO_2$ and $Ta_2O_5$ were both reactive sputtered. The layers had a thickness ratio of about 1:1 ($TiO_2$:$Ta_2O_5$). The optical loss of the laminate versus the total film thickness was measured at 633 nm and 825 nm and is shown in FIG. 4. The optical loss for pure, non-laminated $TiO_2$ films is also shown at 633 nm and 825 nm for the sake of comparison. The laminated films show more than ten times reduction in loss compared to non-laminated $TiO_2$ films. FIG. 5 shows the index of refraction at 633 nm and 825 nm for laminated films having various amounts of TaO. As seen there, laminates having less than about 50% TaO by weight maintain indices of refraction that are about 2.3 or greater at both 633 and 825 nm.

Thus, embodiments of layered optical waveguides and near field transducers are disclosed. The implementations described above and other implementations are within the scope of the following claims. One skilled in the art will appreciate that the present disclosure can be practiced with embodiments other than those disclosed. The disclosed embodiments are presented for purposes of illustration and not limitation.

What is claimed is:

1. A waveguide comprising:
   a top cladding layer made of a material having an index of refraction $n_4$;
   a core bilayer structure, the core bilayer structure comprising:
      a lower index core layer having an index of refraction $n_3$; and
      a higher index core layer having an index of refraction $n_1$, wherein the higher index core layer comprises $TiO_2$ and one or more secondary materials,
      wherein the lower index core layer is adjacent the higher index core layer;
   a bottom cladding layer made of a material having an index of refraction $n_2$,
   wherein the waveguide is configured with the higher index core layer of the core bilayer structure adjacent the top cladding layer and the lower index core layer of the core bilayer structure adjacent the bottom cladding layer, and wherein $n_3$ is less than $n_1$, $n_4$ is less than $n_3$ and $n_1$, and $n_2$ is less than $n_3$ and $n_1$.

2. The waveguide according to claim 1, wherein the higher index core layer comprises a laminated stack of layers.

3. The waveguide according to claim 2, wherein the laminated stack of layers comprise at least one layer of $TiO_2$ and at least one layer of the one or more secondary materials.

4. The waveguide according to claim 2, wherein the one or more secondary material is selected from: $Nb_2O_5$, $CeO_2$, $Ta_2O_5$, $ZrO_2$, $HfO_2$, $Y_2O_3$, $Sc_2O_3$, MgO, $Al_2O_3$, $SiO_2$, or combinations thereof.

5. The waveguide according to claim 2, wherein the higher index core layer comprises a laminated stack composed of layers of $TiO_2$ and layers of one or more than one of $Ta_2O_5$, $Nb_2O_5$, or combinations thereof.

6. The waveguide according to claim 2, wherein the higher index core layer comprises a laminated stack composed of layers of $TiO_2$ and layers of $Ta_2O_5$.

7. The waveguide according to claim 3, wherein the at least one layer of $TiO_2$ and at least one layer of one or more than one of $Nb_2O_5$, $CeO_2$, $Ta_2O_5$, $ZrO_2$, $HfO_2$, $Y_2O_3$, $Sc_2O_3$, MgO, $Al_2O_3$, $SiO_2$, or combinations thereof have a ratio of thicknesses of at least about 1:1 ($TiO_2$:secondary material).

8. The waveguide according to claim 1, wherein the higher index core layer comprises $TiO_2$ doped with one or more than one secondary material.

9. The waveguide according to claim 8, wherein the one or more than one secondary material is selected from: $Nb_2O_5$, $CeO_2$, $Ta_2O_5$, $ZrO_2$, $HfO_2$, $Y_2O_3$, $Sc_2O_3$, MgO, $Al_2O_3$, $SiO_2$, and combinations thereof.

10. The waveguide according to claim 8, wherein the higher index core layer comprises $TiO_2$ doped with one or more than one of $Ta_2O_5$, and $Nb_2O_5$.

11. The waveguide according to claim 8, wherein the higher index core layer comprises $TiO_2$ doped with at least $Ta_2O_5$.

12. The waveguide according to claim 8, wherein the atomic ratio of $TiO_2$ to the one or more than one secondary material is not greater than 1:1 (Ti:secondary material).

13. The waveguide according to claim 1, wherein the higher index core layer comprises at least 50% by weight of $TiO_2$.

14. The waveguide according to claim 1, wherein $n_1$ is at least about 2.3.

15. A device comprising:
   a light source; and
   a waveguide, the waveguide comprising:
      a top cladding layer made of a material having an index of refraction $n_4$;
      a core bilayer structure, the core bilayer structure comprising:
         a lower index core layer having an index of refraction $n_3$; and
         a higher index core layer having an index of refraction $n_1$, wherein the higher index core layer comprises $TiO_2$ and one or more secondary materials,
         wherein the lower index core layer is adjacent the higher index core layer;
      a bottom cladding layer made of a material having an index of refraction $n_2$,
      wherein the waveguide is configured with the higher index core layer of the core bilayer structure adjacent the top cladding layer and the lower index core layer of the core bilayer structure adjacent the bottom cladding layer, and wherein $n_3$ is less than $n_1$, $n_4$ is less than $n_3$ and $n_1$, and $n_2$ is less than $n_3$ and $n_1$,
   wherein the light source and the waveguide are configured so that light from the light source is directed into the waveguide.

16. The device according to claim 15, wherein the light source is selected from a laser diode, a light emitting diode (LED), an edge emitting laser diode (EEL), a vertical cavity surface-emitting laser (VCSEL), or a surface emitting diode.

17. The device according to claim 15, wherein the higher index core layer comprises a laminated stack composed of layers of $TiO_2$ and layers of one or more than one of the secondary materials, $Nb_2O_5$, $CeO_2$, $Ta_2O_5$, $ZrO_2$, $HfO_2$, $Y_2O_3$, $Sc_2O_3$, MgO, $Al_2O_3$, $SiO_2$, or combinations thereof.

18. The device according to claim 15, wherein the higher index core layer comprises $TiO_2$ doped with one or more than one of $Nb_2O_5$, $CeO_2$, $Ta_2O_5$, $ZrO_2$, $HfO_2$, $Y_2O_3$, $Sc_2O_3$, MgO, $Al_2O_3$, $SiO_2$, or combinations thereof.

19. The device according to claim 15, wherein the higher index core layer comprises at least 50% by weight of $TiO_2$.

20. A disc drive comprising;
   at least one actuator arm having a flexure;
   at least one device, wherein each flexure has a head at the distal end thereof and wherein each device comprises:
      a light source; and
      a waveguide, the waveguide comprising:
         a top cladding layer made of a material having an index of refraction $n_4$;

a core bilayer structure, the core bilayer structure comprising:
  a lower index core layer having an index of refraction $n_3$; and
  a higher index core layer having an index of refraction $n_1$, wherein the higher index core layer comprises $TiO_2$ and one or more secondary materials,
  wherein the lower index core layer is adjacent the higher index core layer;
a bottom cladding layer made of a material having an index of refraction $n_2$,
wherein the waveguide is configured with the higher index core layer of the core bilayer structure adjacent the top cladding layer and the lower index core layer of the core bilayer structure adjacent the bottom cladding layer, and wherein $n_3$ is less than $n_1$, $n_4$ is less than $n_3$ and $n_1$, and $n_2$ is less than $n_3$ and $n_1$;
a magnetic reader; and
a magnetic writer.

* * * * *